United States Patent
Takiguchi

(10) Patent No.: US 7,689,025 B2
(45) Date of Patent: Mar. 30, 2010

(54) OPTICAL READING APPARATUS, CHARACTER RECOGNITION PROCESSING APPARATUS, CHARACTER READING METHOD AND PROGRAM, MAGNETIC INK CHARACTER READING APPARATUS, AND POS TERMINAL APPARATUS

(75) Inventor: Yuji Takiguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1132 days.

(21) Appl. No.: 11/159,624

(22) Filed: Jun. 23, 2005

(65) Prior Publication Data

US 2005/0286752 A1 Dec. 29, 2005

(30) Foreign Application Priority Data

Jun. 29, 2004 (JP) ............................. 2004-191363

(51) Int. Cl.
  *G06K 9/00* (2006.01)
  *G06K 9/34* (2006.01)
  *G06K 9/18* (2006.01)
  *G06K 9/36* (2006.01)

(52) U.S. Cl. ..................... 382/139; 382/180; 382/182; 382/292

(58) Field of Classification Search ................. 382/180, 382/139, 182, 292
  See application file for complete search history.

(56) References Cited

U.S. PATENT DOCUMENTS 3,949,363 A * 4/1976 Holm ........................ 382/140
5,077,805 A * 12/1991 Tan .......................... 382/137
5,237,620 A * 8/1993 Deaton et al. ................. 705/10
2004/0240738 A1* 12/2004 Nakajima ................... 382/185

FOREIGN PATENT DOCUMENTS

| EP | 0 651 345 | 5/1995 |
|---|---|---|
| JP | 53-44127 | 4/1978 |
| JP | 56-147273 | 11/1981 |
| JP | 58-109973 | 6/1983 |
| JP | 04-127287 | 4/1992 |
| JP | 7-182448 | 7/1995 |
| JP | 2000-259764 | 9/2000 |

\* cited by examiner

*Primary Examiner*—Bhavesh M Mehta
*Assistant Examiner*—Kathleen S Yuan

(57) ABSTRACT

An optical reading apparatus and optical character recognition processing apparatus operating in conjunction with a magnetic ink character reading apparatus reduce the time in reading a string of characters formed in a line on a processed medium. This is done in the optical reading and recognition operations by selectively using a broad recognition area that allows for variation in character positions and a narrower recognition area where the probability of the desired character string being present is high depending on past results. An extracted image containing the character string is acquired from scanned image data and the recognition process is run. If recognition succeeds, the next matching area is set to a relatively narrow predicted range and the recognition process is applied to the predicted range. If character recognition succeeds within a specified distance, the next matching area is set to a relatively narrow predicted range. If character recognition does not succeed within the specified distance, the next matching area is set to the full width of the extracted image.

11 Claims, 9 Drawing Sheets

OPTICAL READING APPARATUS, CHARACTER RECOGNITION PROCESSING APPARATUS, CHARACTER READING METHOD AND PROGRAM, MAGNETIC INK CHARACTER READING APPARATUS, AND POS TERMINAL APPARATUS

BACKGROUND OF THE INVENTION

1. Field of the Invention

The present invention relates to an apparatus for optically reading characters printed on a check or other processed medium, and to a character recognition apparatus that is embodied in, or adapted to work with, the optical reading apparatus. The invention also relates to a method for reading characters printed on a check or other processed medium, and to a program for implementing this character reading method. The invention further relates to a magnetic ink character reading apparatus that includes the optical reading apparatus, and to a POS terminal apparatus that also includes the optical reading apparatus.

2. Description of the Related Art

Business checks and personal checks (collectively referred to below as simply checks) are commonly used to make payment in a variety of circumstances, for example, in business-to-business transactions as well as for retail purchases in stores and restaurants. Checks are particularly common in the United States and Europe. A bank code, account number, and other information are printed with magnetic ink characters at a specific position (typically a line along the bottom) on each check. When a check is used for payment in a retail store, for example, the user (checking account holder) writes the name of the payee, the check amount in both numbers and words, and then signs the check before giving the check to the store as payment for a purchase. The store can then read the bank code and account number printed in magnetic ink characters, send the read data to the bank or other financial institution or clearing house for verification, and thus know if the presented check is valid or not. If the check is valid, the store prints an endorsement on the back of the check and thus accepts the check as payment.

The bank code and account number information printed in magnetic ink characters are required to settle check payment transactions and must therefore be correctly read. If the magnetic ink characters are incorrectly recognized, transaction processing will proceed based on incorrect data, potentially resulting in major post-processing problems such as the wrong account, that is, an account other than the account on which the check is actually drawn, being debited for payment. Correctly reading the magnetic ink characters is therefore essential when processing check transactions. The character recognition technologies used in magnetic ink character recognition (MICR) readers have therefore been tweaked to improve the recognition rate and reduce character recognition errors.

Japanese Unexamined Patent Appl. Pub. H7-182448 provides technology for improving the recognition rate by also using an optical character recognition (OCR) reader to optically read characters that could not be read magnetically.

Considering the potential for erroneously recognizing the content even though the characters can be read, Japanese Unexamined Patent Appl. Pub. 2000-259764 provides technology for reducing the false recognition rate by comparing the recognition output of the MICR reader and the recognition output of the OCR reader and accepting as correct only those results that are the same.

A problem with adding a process for reading characters using an optical reading apparatus is that more time is required for the reading process. Moreover, in order to ensure that all of the magnetic ink characters are optically read, a larger area than the actual area of the magnetic ink characters must be processed. A larger area must be processed because of variations, for example, in the printing position of the magnetic ink characters, variations in check dimensions, and variations in the dimensions of the MICR reader. Applying the character recognition process to a larger area, however, necessarily increases the time required to perform the process.

SUMMARY OF THE INVENTION

An object of the present invention is therefore to provide an optical reading apparatus, optical character recognition processing apparatus, character reading method and program that is capable of reducing the time it takes to read and recognize a string of characters on a processed medium. The invention achieves this by selectively using a broad recognition area that allows for variation in character positions and a narrower recognition area in which the probability of the desired character string being present is high depending on past results. The optical reading apparatus may be embodied in a magnetic character reading apparatus that may be further embodied in a POS terminal apparatus, and the optical reading and recognition method may be operated in conjunction with a magnetic reading and recognition method.

According to one aspect of the invention, an optical reading apparatus reads a string of characters acquired from a sheet medium and contained in a scanned image. The apparatus comprises an optical character recognition unit for extracting a recognition image containing the character string and a neighboring image area from the scanned image, and applying a recognition process to the recognition image by comparing each matching or target recognition area in the recognition image with templates; and a matching area determination unit for determining a size of each of a second and subsequent matching areas to which the optical character recognition unit applies the recognition process based on a position at which a character in the string in an immediately previous matching area was recognized.

In another aspect, the invention involves a character reading method comprising acquiring a scanned image containing a string of characters; extracting a recognition image containing the character string and a neighboring image area from the scanned image; applying a recognition process to the recognition image by comparing each matching or target recognition area in the recognition image with templates; and determining a size of each of a second and subsequent matching areas to which the recognition process is applied based on a position at which a character in the string in an immediately previous matching area was recognized.

Such a method may be performed in response to execution by a computer or similar device of a corresponding program of instructions that are contained on a computer-readable medium.

Thus, the size of the matching area that is processed next for character recognition is based on the position of the character recognized by the optical character recognition unit in the previous matching area. In order to reliably read the characters, each matching area must be large enough to account for variations in the printing positions of the characters, variation in the dimensions of the processed medium, and variations in the dimensions of the reading apparatus. On the other hand, adjacent characters usually deviate very little from the specified standard character positions. Therefore, setting the next matching area based on the position of the just-recognized character justifiably enables setting that matching area to a narrow width that still provides sufficient tolerance for offset variations that might occur between adjacent characters. The range to which the recognition process is applied is therefore narrower, and the time required to run the recognition process can be reduced.

Preferably, in cases in which a character was recognized in the previous matching area, the matching area determination unit sets the width of the next matching area to a specified width plus a specific correction margin. The width dimensions are measured in the direction substantially perpendicular to the direction of the character string being read.

The width of the matching area set in the direction perpendicular to the base line of the character string is thus the width of the template in the same direction when the template is positioned at the location of the recognized character plus a specific correction margin. Adjacent characters usually deviate very little from the specified standard character positions, and the likelihood that the next character is located within the width of the template in the direction perpendicular to the base line of the character string when the template is aligned at the position of the recognized character is therefore high. Furthermore, by adding a specific margin to this width to allow for the slight deviation that might occur between the positions of adjacent characters, the likelihood that the next character will be in the matching area is even higher. The likelihood that the optical character recognition unit can recognize the next character can be increased as a result of the matching area determination unit thus setting the width of the matching area in the direction perpendicular to the base line of the character string to the width of the template in the direction perpendicular to the base line of the character string when the template is positioned at the location of the recognized character plus a specific correction margin.

Further preferably, when an area in which the optical character recognition unit cannot recognize the reading target continues beyond a specified distance from the next-character side of the template when the template is at the position of the recognized character, the matching area determination unit sets the width of the matching area perpendicularly to the character string to the width of the extracted recognition image perpendicularly to the character string.

Yet further preferably, when the optical character recognition unit cannot recognize a character in the reading target within a specified distance from the beginning of a particular matching area, the matching area determination unit resets the width of that matching area to the width of the recognition area at the specified distance.

That is, when an area in which the reading target cannot be recognized continues beyond a specified distance, the width of the matching area perpendicularly to the base line of the character string is then set to the full width of the extracted recognition image. Thus, from the specified distance the recognition process is applied to the full width of the extracted recognition image.

Checks are often printed with a background image and are signed by the user. Parts of the background image or signature may also be mistakenly recognized as one of the magnetic ink characters. Characters thus mistakenly recognized from the background image or signature are referred to herein as noise characters.

The likelihood of such noise characters being present where the character string is printed is low, but the likelihood that noise characters are offset in the direction perpendicular to the base line of the magnetic ink characters is high. Therefore, if character recognition continues using matching areas predicted from the position of a noise character, the likelihood is high that an area where the desired character string is not present will be processed. However, the likelihood that a series of consecutive noise characters will be similarly mistakenly recognized is extremely low, because the likelihood that a blank space that cannot be recognized follows a mistakenly recognized noise characters is high.

Therefore, if the area in which character recognition is not possible continues for more than a specified distance, re-applying the recognition process to the full width of the image increases the likelihood that the characters in the intended recognition target located at a position separated from the mistakenly recognized noise character can be recognized.

An optical reading apparatus as described in any of the variations above may be disposed to a character reading system comprising a hybrid processing apparatus and host apparatus. An optical reading unit may be disposed in the hybrid processing apparatus, and the optical character recognition unit and matching area determination unit are disposed in the host apparatus. Such a configuration enables an optical reading apparatus as described above to be realized by installing and executing a program in the host apparatus.

In another aspect of the invention, a magnetic ink character reading apparatus has an optical reading apparatus as described above, a hybrid processing apparatus, and a host apparatus. The hybrid processing apparatus has a magnetic reading unit for magnetically acquiring magnetic data from the character string, which in this case are magnetic ink characters, and may further include an optical reading unit. The host apparatus has a magnetic recognition processing unit for recognizing the magnetic data. The optical character recognition unit and the matching area determination unit are also disposed in the host apparatus.

The MICR apparatus of this aspect of the invention thus has an optical reading apparatus that can suppress any increase in the time required for the character recognition process during optical character recognition, and can thus suppress an increase in the time required for the MICR apparatus to run the magnetic ink character recognition process.

Yet further preferably, the hybrid processing apparatus of the MICR apparatus has a printing unit for printing based on data sent from the host apparatus. By thus also providing a printing unit, magnetic ink character reading and printing the front and back of a check can be handled by a single apparatus when processing check transactions at a POS terminal.

A POS terminal according to another aspect of the present invention has a magnetic ink character reading apparatus as described above. When MICR and OCR results do not match because of an OCR error when processing checks at a POS terminal, for example, this aspect of the invention enables improving the mismatch rate and thus improving the correct recognition rate.

BRIEF DESCRIPTION OF THE DRAWINGS

FIG. 3 is an exemplary illustration of magnetic ink characters;

DESCRIPTION OF THE PREFERRED EMBODIMENTS

Figure 1:
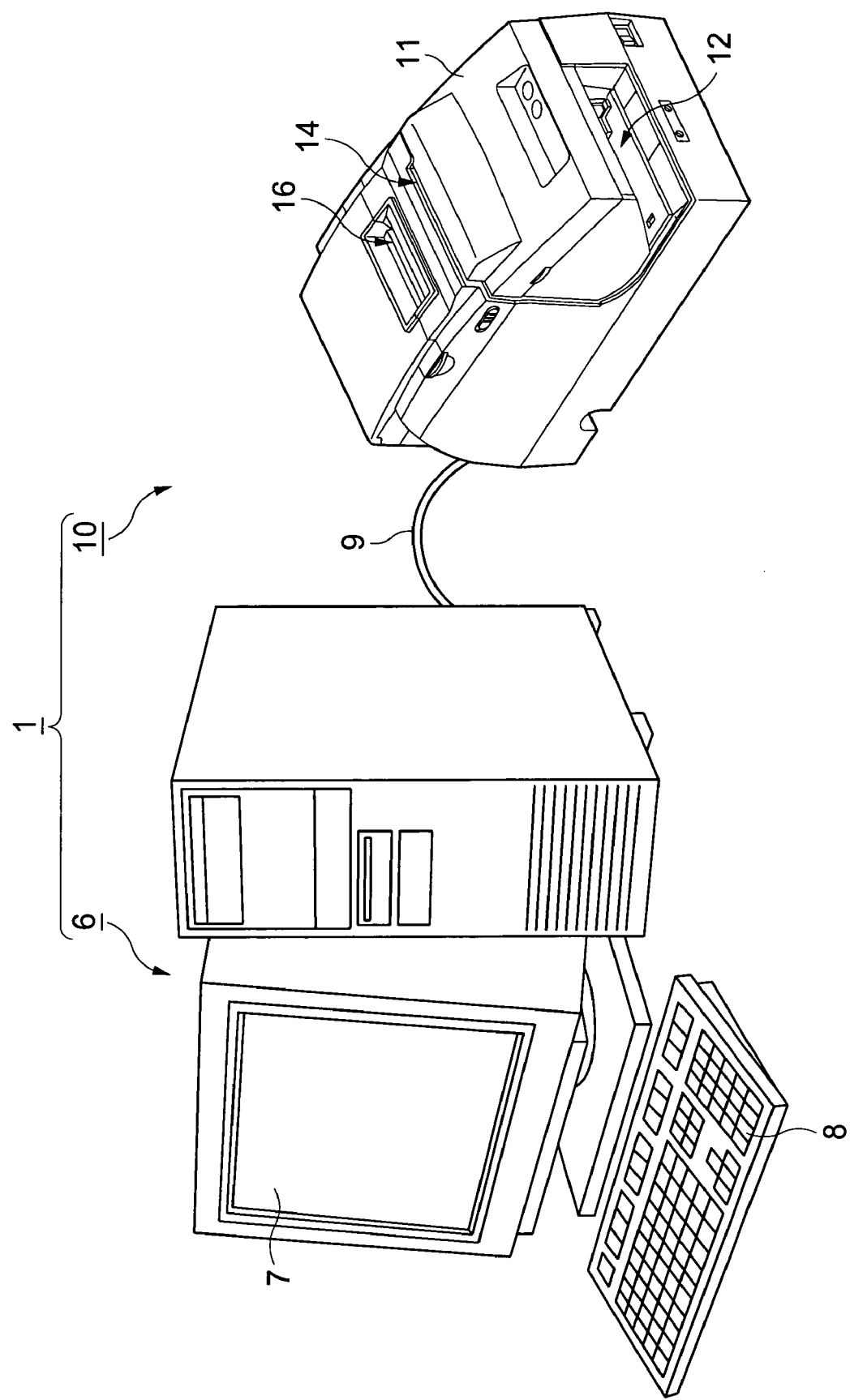
FIG. 1 is an oblique view showing a host apparatus and hybrid apparatus having the ability to recognize magnetic ink characters magnetically and optically according to embodiments of the present invention.
Figure 2:
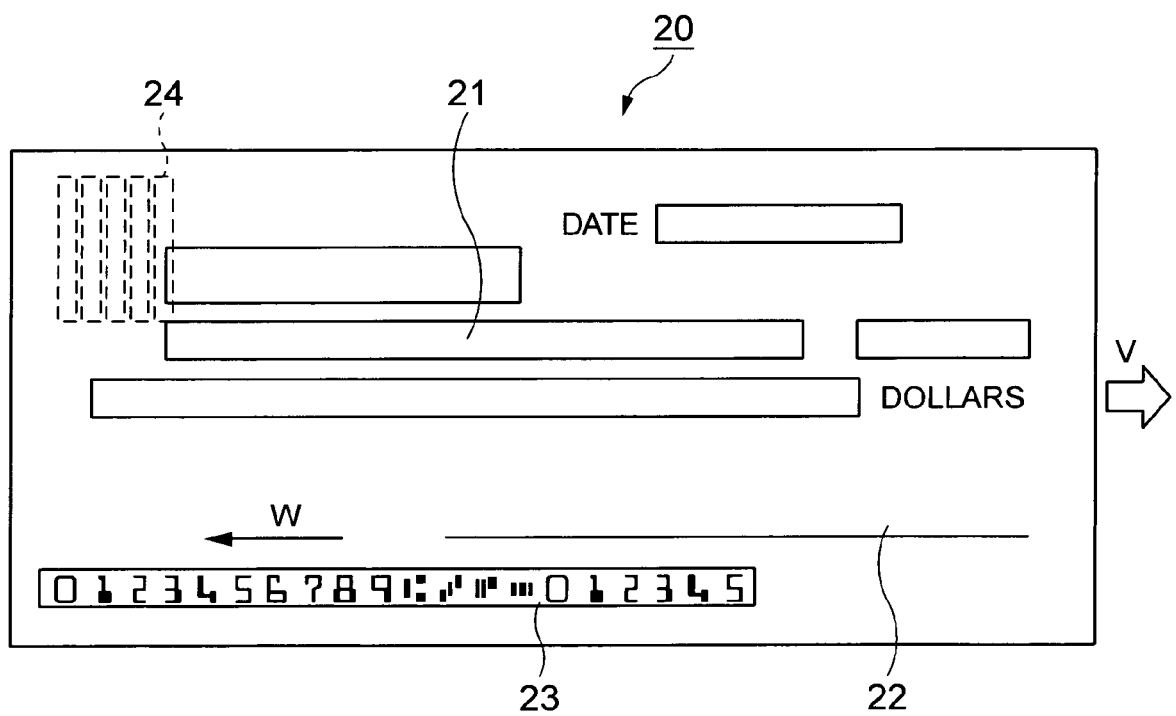
FIG. 2 is a plan view of a check used by way of example as a processed medium.

Preferred embodiments of an optical reading apparatus according to the present invention are described below with reference to the accompanying figures. FIG. 1 is an oblique view of a host apparatus and a hybrid apparatus having the capability to both magnetically and optically read magnetic ink characters according to embodiments of the invention. FIG. 2 is a plan view showing, by way of example, the face of a check as a processed medium. To complete a check transaction, the front of the check is filled out, including the payment amount and signature, check validity is confirmed, and the check is endorsed. By providing a magnetic ink character reading apparatus in a printer, as embodiments of this invention do, the entire check processing operation including reading the magnetic ink characters and printing information on the front and back of the check used in the transaction can be executed by a single machine.

The present invention relates to an apparatus and a method for reading magnetic ink characters printed or otherwise disposed on a medium, such as a check. While this invention is most commonly used to process checks and is described below using checks by way of example as the processed medium, the invention is not limited to that specific medium; rather, the invention can also be used to process other financial instruments and documents, including cashier checks and money orders. Furthermore, while the invention does not necessarily require a printer, the following embodiments are described in connection with processing checks, which is the most typical application of the invention, the invention is described with reference to a magnetic ink character reading apparatus 1 having a hybrid processing apparatus 10 that is capable of performing a magnetic ink character reading function, an optical reading function, and a printing function.

The host apparatus 6 shown in FIG. 1 has a display unit 7 and operating unit 8. The hybrid processing apparatus 10 shown in FIG. 1 is enclosed in a plastic cover 11, and an insertion slot 12 for manually inserting checks 20 as the processed medium is formed in the front portion of the hybrid processing apparatus 10. Checks inserted from the insertion slot 12 are discharged from the exit opening 14 formed at the top.

The hybrid processing apparatus 10 also has a roll paper compartment (not shown in the figure) formed in the back portion of the hybrid processing apparatus 10 for holding roll paper. Roll paper housed in the roll paper compartment is conveyed passed the printing unit and discharged from the roll paper exit 16 formed in the top of the apparatus. The host apparatus 6 and hybrid processing apparatus 10 communicate through a suitable communication path, e.g., by a cable 9 that electrically connects the two apparatuses.

The front of the check 20 as shown in FIG. 2 has a front printing area 21 for printing the payment information, a signature area 22 where the user signs the check, and a MICR recording area 23 where the magnetic ink characters are printed. An endorsement printing area 24 for recording endorsement information is on the back of the check 20.

The payee, date, and amount are recorded in the front printing area 21. The person (customer) using the check 20 and paying for the purchase signs the check in the signature area 22. Endorsement information required by the party accepting the check 20 is recorded in the endorsement printing area 24. This endorsement information may contain a verification number for the person using the check 20, the date, and the check amount, for example. The account number and bank code for the account and bank on which the check 20 is drawn are printed in magnetic ink characters in the MICR recording area 23.

A check 20 is inserted into the insertion slot 12 in the direction indicated by arrow V in FIG. 2. The hybrid processing apparatus 10 then captures magnetic data and optical image data from the magnetic ink characters printed in the MICR recording area 23 while conveying the check 20 through the transportation path. The data sent from the hybrid processing apparatus 10 to the host apparatus 6 is processed for character recognition by the host apparatus 6. The text string of magnetic characters is recognized sequentially from the right end of the check as seen in FIG. 2 in the direction of arrow W.

When a customer uses a check 20 to pay for a purchase in a retail store, for example, the store clerk often prints the store name as the payee, the check amount in both numbers and words, and the date using the printing mechanism of the hybrid processing apparatus 10, and then returns the check 20 to the customer. The customer confirms that the payee and check amount printed in both numbers and words are correct, then signs and returns the check to the clerk as payment. The store then reads the bank code and account number printed in magnetic ink characters, and sends the account information to the bank or check-clearing house to determine if the check 20 is valid. If the check is valid, the retailer prints an endorsement on the back of the check 20, and thus accepts the check as payment and completes the check payment process.

Figure 3:
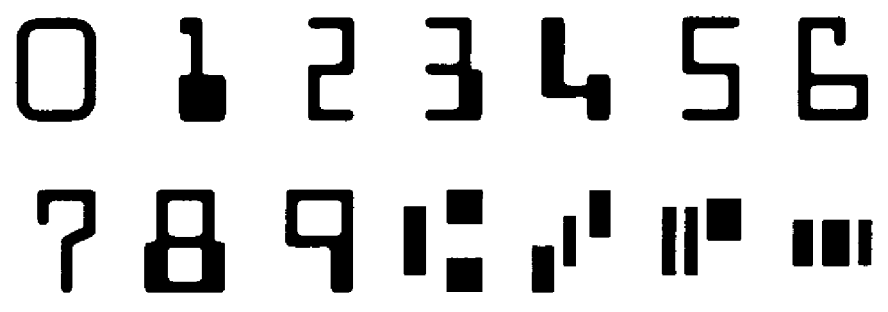

FIG. 3 shows the shape of the magnetic ink characters according to one common standard. Magnetic ink characters printed in the MICR recording area 23 are read with an MICR head. The MICR head is composed of a permanent magnet and a magnetic head. The magnetic ink contains a magnetic powder mixed with ink. As a result, the magnetic ink characters are magnetized when the check 20 passes over the permanent magnet. When the magnetized magnetic ink characters then pass over the magnetic head, the magnetic flux varies according to the shape of the magnetic ink characters, and a signal with a waveform corresponding to the shape of each character is output from the magnetic reading head. Because the shape of each magnetic ink character is determined according to a specific standard, the magnetic ink characters can be read from the waveform patterns. Common MICR character fonts are known as E13B and CMC7. The E13B font defines 14 different characters, specifically the numbers 0 to 9 and four different symbols. The magnetic ink characters shown in FIG. 3 are in the E13B font.

Figure 4:
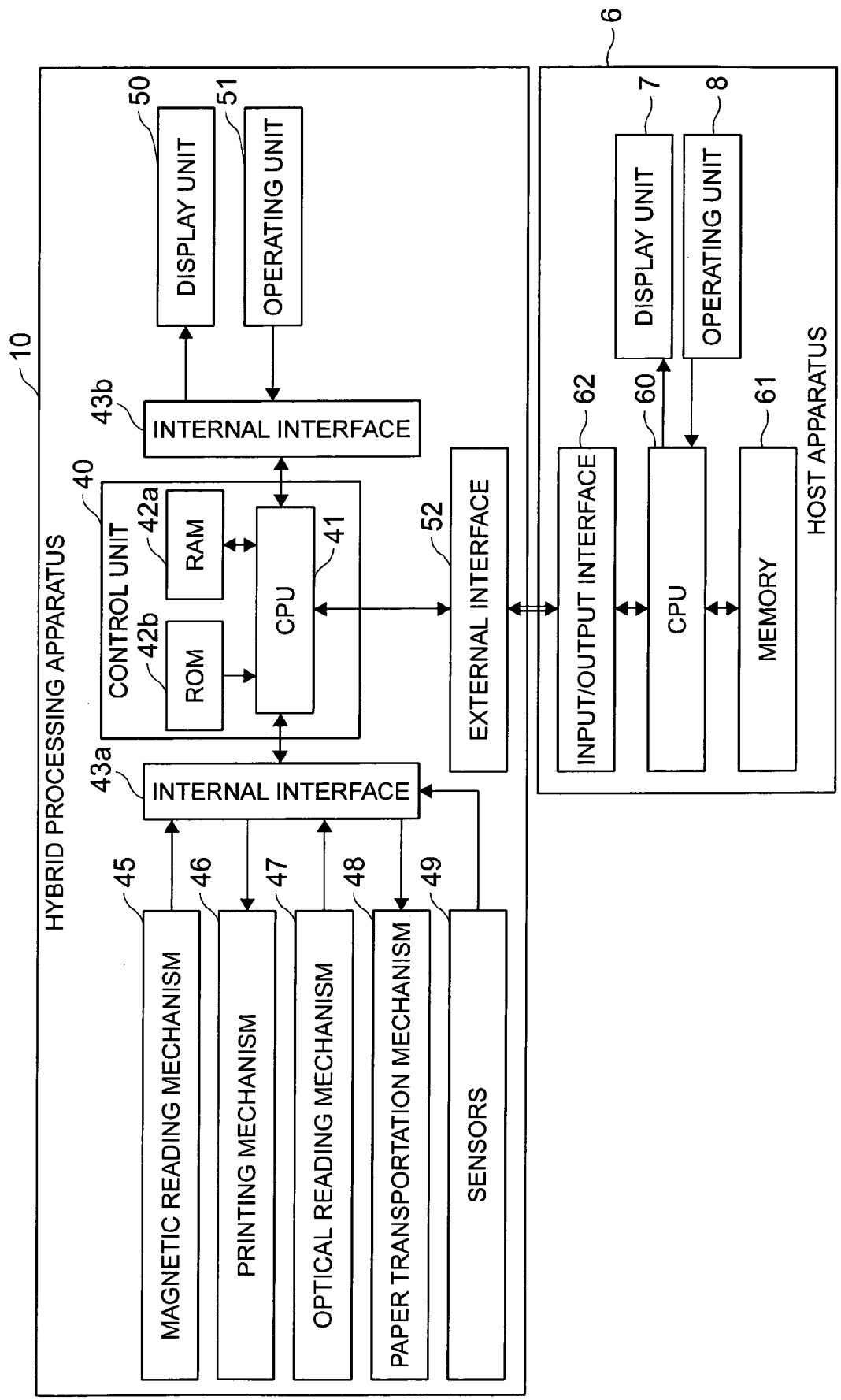
FIG. 4 is a block diagram showing the main hardware components of the hybrid processing apparatus according to embodiments of the invention.

The electrical arrangement for driving this magnetic ink character reading apparatus 1 is described next. FIG. 4 is a block diagram showing the main hardware elements of this magnetic ink character reading apparatus 1.

The control unit 40 centrally controls the operation of the other parts of the hybrid processing apparatus 10. The control unit 40 has a CPU (central processing unit) 41 for executing logic operations, RAM (random access memory) 42a for temporarily storing control commands and print data received from the host apparatus 6, and ROM (read-only memory) 42b for storing routines for the logic operations run by the CPU 41. The CPU 41, ROM 42b, and RAM 42a are electrically interconnected by a bus or equivalent.

Connected to the CPU 41 through internal interface 43a and internal interface 43b are the magnetic reading mechanism 45, printing mechanism 46, optical reading mechanism 47, paper transportation mechanism 48, various sensors 49, a display unit 50, and an operating unit 51. The CPU 41 controls the operation of these other units based on a control program stored in ROM 42b. Each mechanism also has any necessary logic circuits needed by that mechanism.

The hybrid processing apparatus 10 is connected to a host apparatus 6 such as the host computer of a POS terminal through an external interface 52, and operates under the control of the host apparatus 6.

The host apparatus 6 has a CPU 60 for running logic operations and controlling operation of the hybrid processing apparatus 10 and the other parts of the host apparatus 6. Communicating with the CPU 60 are memory 61 for storing control commands, print data, and a control program, an input/output interface 62, display unit 7, and operating unit 8. The host apparatus 6 communicates with the hybrid processing apparatus through an input/output interface 62.

Figure 5:
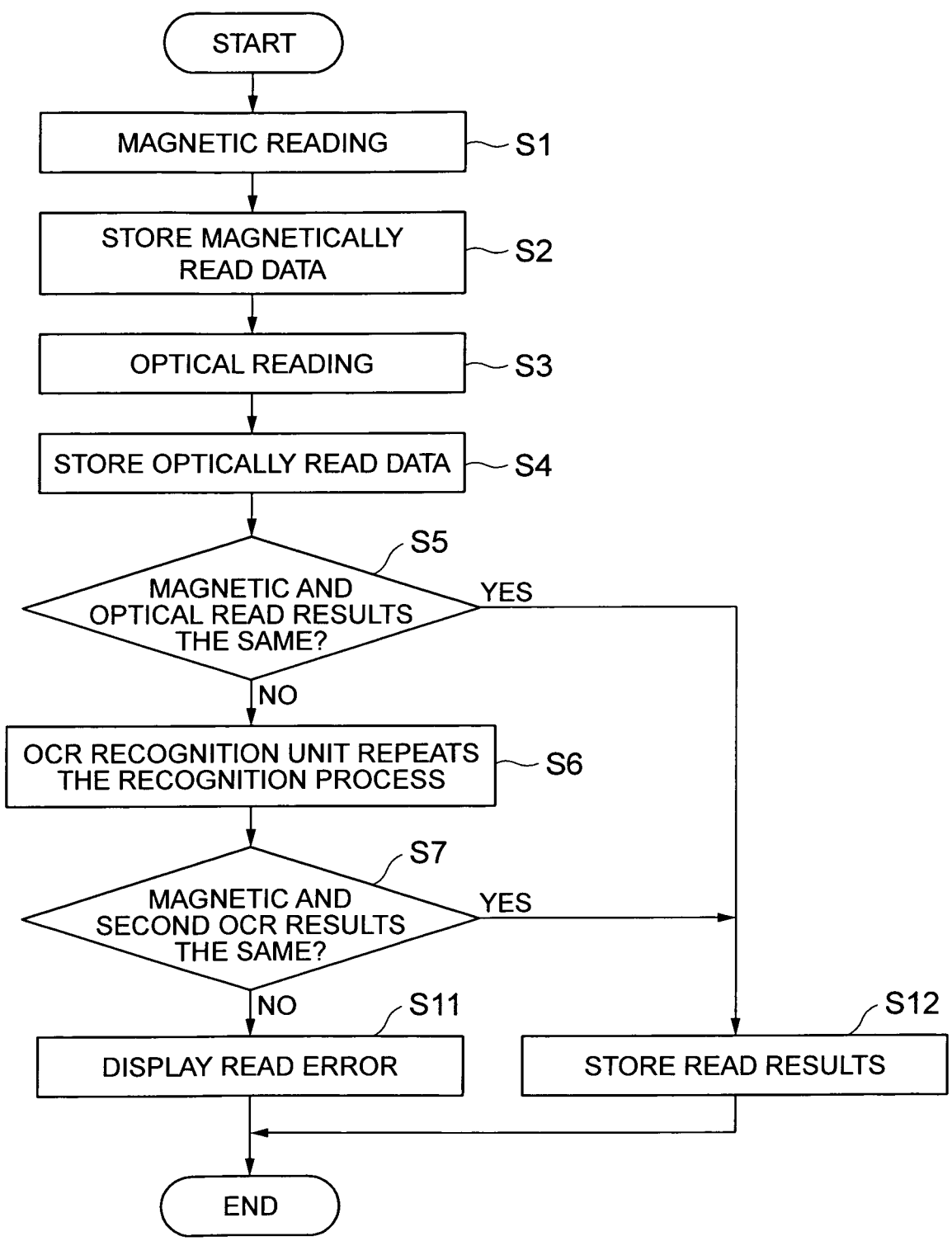
FIG. 5 is a flow chart describing a sequence of reading magnetic ink characters.

A process for reading the bank code and checking account number printed in magnetic ink characters in the MICR recording area 23 of the check 20 using the foregoing hybrid processing apparatus 10 is described next below. FIG. 5 is a flow chart of a process for reading a magnetic ink character text string according to this preferred embodiment of the present invention.

A check 20 is inserted to the insertion slot 12 and then conveyed by the paper transportation mechanism 48 through the paper path. As the check 20 is conveyed the magnetic ink characters are first read magnetically by the magnetic reading mechanism 45. Magnetic data acquired by the magnetic reading mechanism 45 is sent to the host apparatus 6 and the CPU 60 applies a magnetic ink character recognition process to the magnetic data. The magnetic data is converted from analog to digital form, and the magnetic ink characters are extracted, smoothed, and normalized to acquire normalized data. This normalized magnetic data is then compared with reference data stored in memory 61. If the magnetic data and reference data match within a specific tolerance range, the magnetic data is recognized as the character corresponding to the matching reference data. The location from which the magnetic data matching the reference data was extracted is also recognized as the character position of the recognized character. This recognition process is applied to all magnetic ink characters in the text string, after which the character recognition process performed by the magnetic character recognition unit ends.

Magnetic reading mechanism 45 thus performs the functions of a magnetic character reading unit, and the CPU 60 and memory 61 perform the functions of a magnetic character recognition unit.

The characters corresponding to the reference data that match the magnetic data and the character positions are stored as the magnetic reading result in the memory 61 in step S2.

In step S3 the optical reading mechanism 47 optically scans the magnetic ink characters. More specifically, the optical reading mechanism 47 images the check 20, and the image data is sent to the host apparatus 6. The CPU 60 then extracts an image in a specified range containing the magnetic ink characters from the image data sent to the host apparatus 6, and runs a magnetic ink character recognition process. This recognition process compares the extracted image with templates. Each character in the image data is compared to multiple specific templates. If the coincidence between a particular character and template is within a specific range, that character is recognized as the one represented by the template.

Figure 6A:
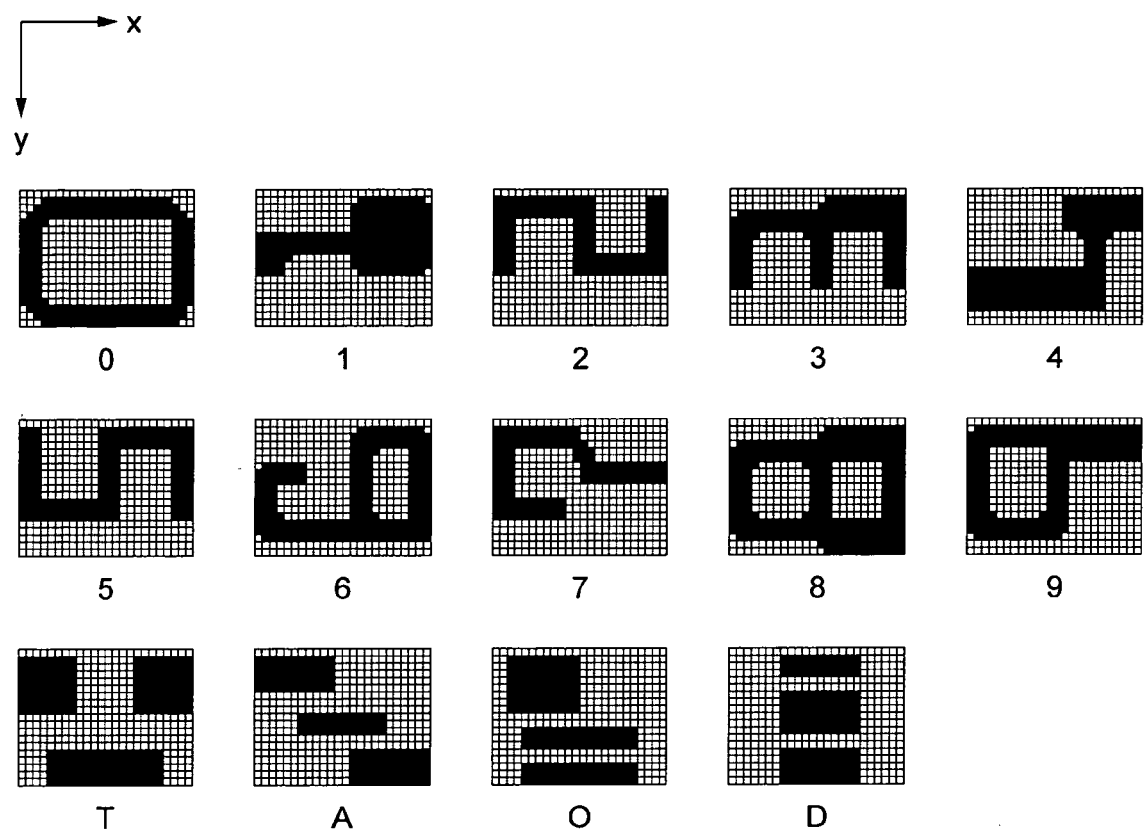
FIG. 6A shows templates of various magnetic ink characters.
Figure 6B:
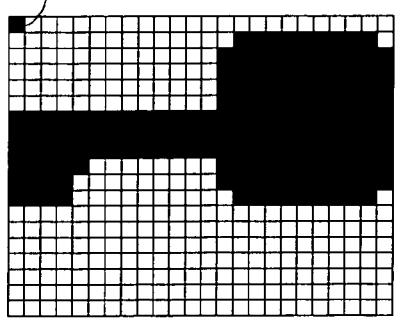
FIG. 6B shows an enlarged view of the template for the number one.

FIG. 6 shows an example of the template data. FIG. 6A shows templates for recognizing characters in the E13B font shown in FIG. 3. FIG. 6B is an enlarged view of the template for the number "1." For purposes of description below, the character height is along the x-axis and character width is thus denoted on the y-axis perpendicular to the x-axis. The same xy-axis is used in FIG. 7.

Each character template is 24 dots wide along the x-axis and 19 dots wide along the y-axis, and thus consists of 456 dots. The dots are black or white, and the shape of the set of black dots is the shape of the character. Each template has a fixed origin as indicated in FIG. 6B, and the area measuring 24 dots wide along the x-axis and 19 dots high along the y-axis counted from and including the origin is the area (size) of one character.

To compare the scanned character images with the templates, the extracted image 70 is segmented or divided along the y-axis into matching areas, each of a size sufficient to contain one character in the MICR image 71. Multiple comparison areas each measuring approximately 24 dots on the x-axis and approximately 19 dots on the y-axis in each matching area are each compared with each of the 14 templates to calculate the mismatch rate of the black or white dots relative to the 456 dots in each comparison area.

Figure 7:
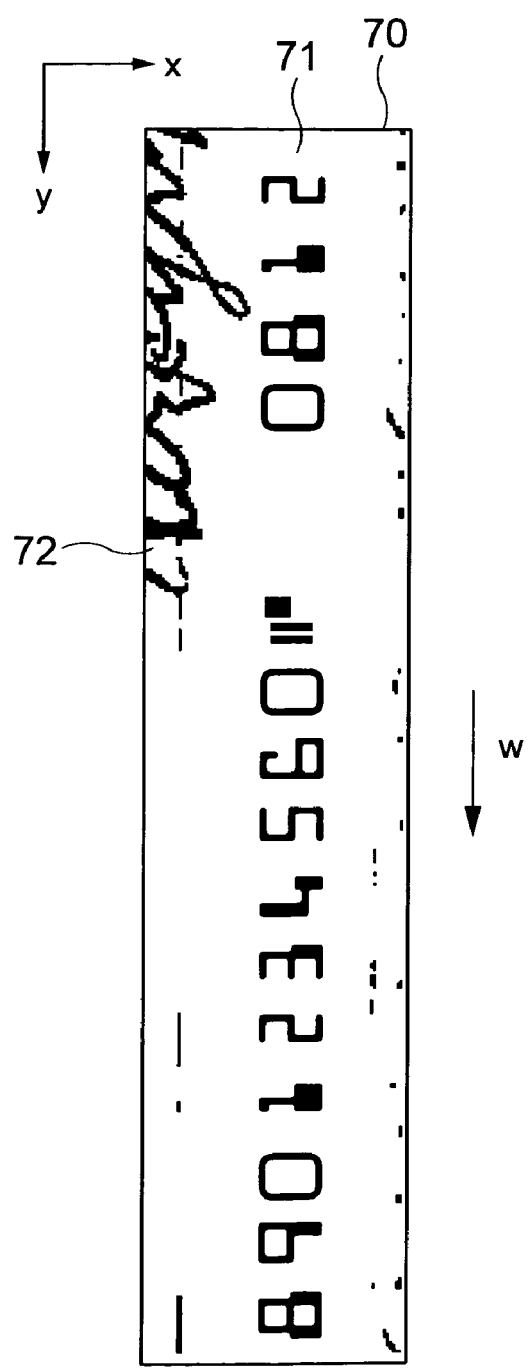
FIG. 7 shows an example of an extracted image containing a sequence of magnetic ink characters.
Figure 9:
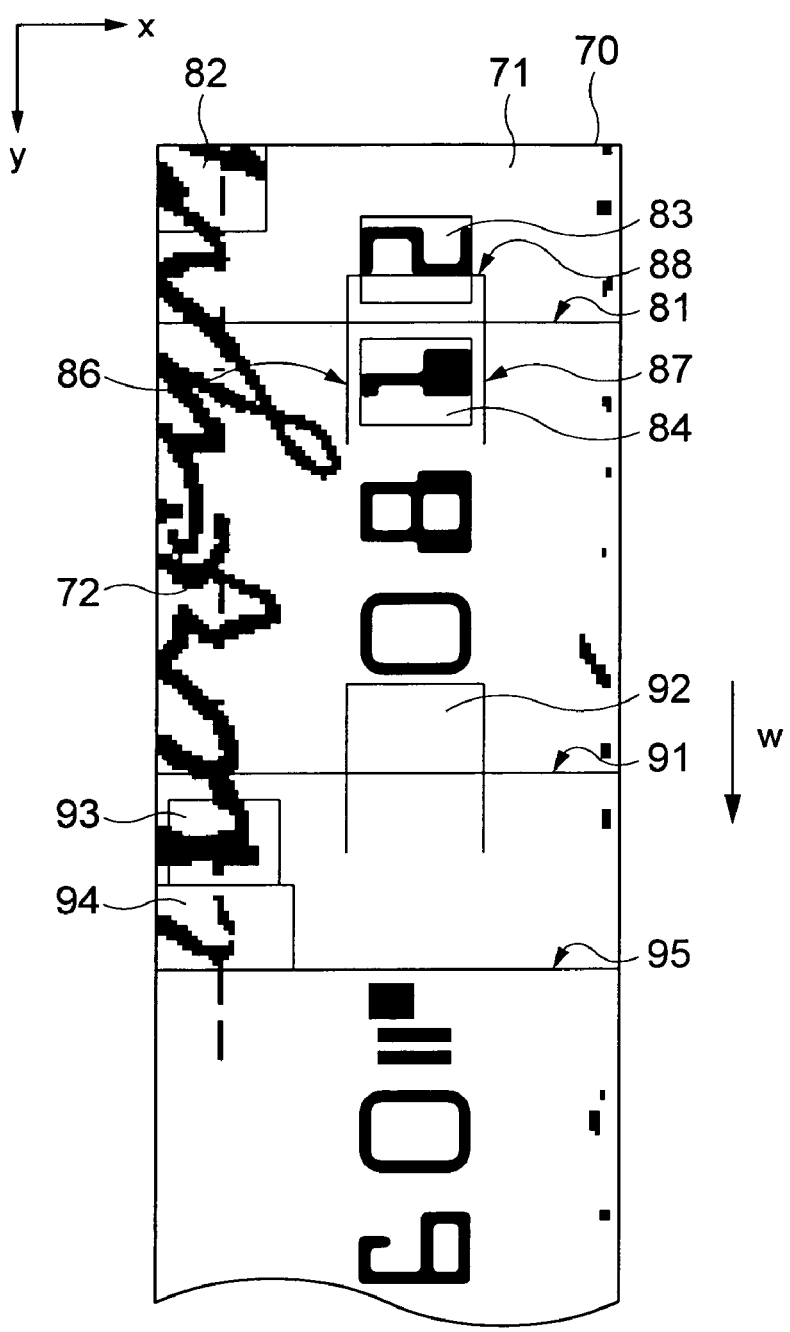
FIG. 9 shows selected parts of an enlarged extracted image.

In a first matching area, a comparison area compared with the templates to determine the mismatch rate is the area measuring 24 dots on the x-axis and 19 dots on the y-axis starting from the top left corner of the extracted image 70 as seen in FIGS. 7 and 9. The next area compared with the templates is the area measuring 24 dots on the x-axis and 19 dots on the y-axis offset one dot in the x-axis direction. This process of shifting the comparison area one dot on the x-axis and again comparing it with the 14 templates is repeated until the right side of the comparison area coincides with the right end of the matching area shown in FIG. 7, and the mismatch rate is determined for each of the comparison areas. The comparison area is then moved back to the left side as seen in FIG. 7 and shifted one dot on the y-axis; the template comparison is repeated for that comparison area. The comparison area is again shifted one dot at a time on the x-axis and the template comparison is repeated to determine the mismatch rate for each comparison area until the right end of the matching area is reached. The process then begins again for the next matching area. That is, the comparison area is compared against the templates, and then shifted as explained above until that matching area has been analyzed. This comparison process continues until each matching area has been analyzed to determine the mismatch rate for each of the comparison areas of each of the matching areas.

If the mismatch rate for a particular comparison area relative to a specific template is within a specific limit, the character represented by that template is recognized as the printed character, and the position of that comparison area is recognized as the character position. Note that the character position is referenced to the location of the template origin (see FIG. 6B). If the mismatch rate is within the specific limit for a plurality of comparison areas, or if the mismatch rate between a comparison area and a plurality of templates is within the specific limit, the position of the comparison area having the lowest mismatch rate and the character of the corresponding template are recognized as the character position and character recognized for that matching area. Note that the recognition target range is equivalent to the recognition target area, and is also referred to herein as the matching area. When the recognition process ends for one matching area, the same recognition process is applied to the next matching area.

The matching area to which the recognition process is first applied is the matching area along the top edge of the extracted image 70 as seen in FIG. 7. The matching area to which the recognition process is applied next is the matching area adjacent to the matching area that was read first, and so on. The recognition process thus continues through the matching area at the bottom edge of the extracted image 70 in FIG. 7, after which the character recognition process of the optical character recognition unit ends.

Note that the extracted image 70 corresponds to the recognition image. The optical reading mechanism 47 corresponds to an optical reading unit.

The CPU 60 and memory 61 correspond to the optical recognition processing unit and recognition area determination unit. The CPU 60 and memory 61 also correspond to the recognition processing apparatus of the host device. The optical reading mechanism 47, CPU 60, and memory 61 correspond to the optical reading apparatus.

The character positions and characters recognized in each matching area are stored in memory 61 as the optical character recognition result in step S4 following step S3 in FIG. 5.

Whether the characters in the MICR recognition result are the same as the respective characters in the OCR result is then determined in step S5. If the characters from the OCR result and characters from the MICR result are the same (step S5 returns yes), the character string printed in magnetic ink characters in the MICR recording area 23 is determined to have been correctly read, and control advances to step S12. The reading results that are the same in the OCR results and MICR results are then stored as the reading result in memory 61 in step S12, and reading the text string printed in the MICR recording area 23 ends.

If the characters from the OCR result and the characters from the MICR result are not the same (step S5 returns no), the text string may have not been correctly read by the optical reading mechanism and control therefore goes to step S6. In this case, the OCR processor of the OCR device therefore applies the OCR process a second time to the comparison areas of each matching area for which the character from the OCR result and the character from the MICR result differ. The result of applying the OCR process a second time to the comparison areas for which the characters from the OCR result and the characters from the MICR result differ is referred to below as the "second OCR result." The second OCR result is then compared with the characters from the MICR result to determine if the results are the same. If the second OCR result and the MICR result differ (step S7 returns no), control goes to step S11.

If the OCR result and the MICR result do not match even after the optical character recognition unit of the OCR device repeats the OCR process, the likelihood is high that the image cannot be read and the image is preferably disposed of as being unreadable. A message that the check is unreadable is therefore preferably sent to the display unit 7 of the host apparatus 6, and reading the character string printed in the MICR recording area 23 ends.

If in step S7 the characters in the second OCR result from the OCR device are compared with the characters in the MICR result stored in the memory 61 and determined to be the same (step S7 returns yes), the characters printed in magnetic ink characters in the MICR recording area 23 were read correctly and control thus goes to step S12. The matching recognition results from the OCR process and MICR process are then stored as the reading result in memory 61, and reading the character string printed in the MICR recording area 23 ends.

FIG. 7 shows an example of the extracted image 70. The area contained within the extracted image 70 is set to contain the standardized MICR recording area 23. Considering possible variation in the position of the MICR recording area 23 and the dimensions of the check 20, the extracted image 70 is sufficiently larger than the size of the MICR image 71, which is an image of the MICR recording area 23. Because a sufficiently large area is extracted, the extracted image 70 also contains a portion of the signature image 72, which is an image of the signature of the person that signed the check 20. As noted above, the character height is along the x-axis and the character string is spaced along the y-axis perpendicular to the x-axis, the same orientation as that used in FIG. 6. The direction of arrow W is also the same as the direction of arrow W in FIG. 2.

The extracted image 70 corresponds to the recognition image. Further note that the character string shown in FIG. 7 is a hypothetical string of characters used for description alone, and unlike a character string with specific meaning such as printed on an actual check, is a string of characters with no specific meaning.

Figure 8:
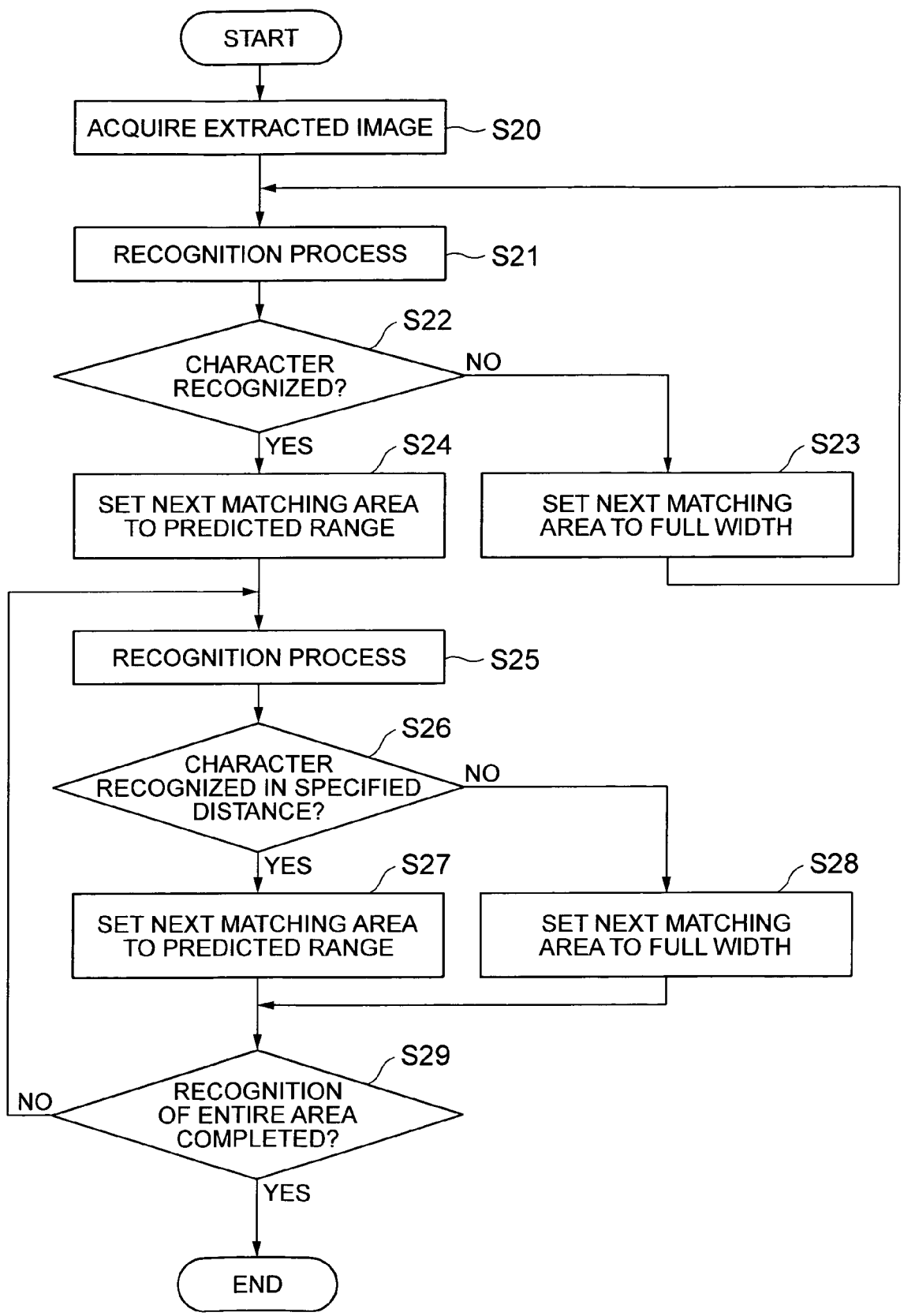
FIG. 8 is a flow chart describing a process of optically re-reading magnetic ink characters.

The optical character reading process run by the OCR device in step S3 in the process of reading a string of magnetic ink characters shown in FIG. 5 is described in detail below. FIG. 8 is a flow chart showing a preferred embodiment of the optical character reading (OCR) process of the OCR device. FIG. 9 is an enlarged view of the extracted image.

The extracted image 70 is acquired in step S20. The optical reading mechanism 47 images the check 20 and sends the image data to the host apparatus 6. The CPU 60 then processes the image data sent to the host apparatus 6 to extract an image of a specific area containing the magnetic ink characters as the extracted image 70.

The optical character recognition process is then applied to the MICR image 71 contained in the extracted image 70 (step S21). The MICR image 71 is compared with templates, and if the match between the image data and template data is within a specific tolerance range, the image is recognized as the character represented by that template.

To compare the image with the templates, the extracted image 70 is divided along the y-axis into matching areas determined by the size of one magnetic ink character in the MICR image 71, and compared with the templates using the process of shifting the comparison area, as explained above. The ranges of the matching areas along the y-axis is determined by detecting black dots throughout the extracted image 70, but for purposes of discussion below the ranges along the y-axis are assumed to be already known. In the extracted image 70 shown in FIG. 9, the first matching area is the full width of the extracted image 70 along the x-axis and from the top edge of the extracted image 70 to line 81 along the y-axis.

In the extracted image 70, used by way of example in this embodiment, comparison area 83 is the comparison area with the lowest mismatch rate. The position of this comparison area 83 is therefore set as the position of the first recognized character, and the recognized character, that is, the read character, is the number "2."

Whether character recognition succeeded is then determined in step S22. If a character was not recognized (step S22 returns no), the next matching area remains set to the full width of the extracted image 70 (step S23) and operation returns to step S21 to continue the recognition process in the matching area in which the full width along the x-axis of the extracted image 70 is the recognition range.

Step S22 may return no when the template mismatch rate is high because the image of the first magnetic ink character is incomplete or malformed, obscured by noise characters, or otherwise distorted and unrecognizable.

If the character was recognized in step S22 (step S22 returns yes), the next matching area is set to a predicted range in step S24. In the example shown in extracted image 70, the position of the next character is predicted to be comparison area 84, which is offset by the pitch of one character from the position of comparison area 83. The x-axis range of the next matching area, which is the predicted range, is from line 86 to line 87. This range is the x-axis range of the comparison area 83 plus a correction margin on both sides. This correction margin allows for variation in the x-axis position of adjacent characters and can be a small value because this variation is rarely large. This correction margin is therefore set to 5 dots in this embodiment of the invention.

The starting position of the predicted range along the y-axis is known because the y-axis range has already been determined as described above. Considering the white part of the templates (see FIG. 6), a position that overlaps the character part of the recognized character (that is, the black dots) is not used as the starting position. The starting position of the second matching area in the extracted image 70 used in this example is therefore line 88 below the part containing the character "2" in comparison area 83.

The recognition process is then run in step S25 on the predicted range set in step S24. This time, however, comparison with the templates starts from the comparison area starting from the top left corner of the matching area delineated by line 88, line 86, and line 87, and the mismatch rate between each comparison area and each template is determined while shifting the comparison area one dot at a time along the x-axis until the right edge of the comparison area coincides with line 87. If the correction margin is 5 dots wide on each side as described above, there are only eleven comparison areas along the x-axis to compare with each of the templates. The comparison area is then shifted one dot down along the y-axis as described above and each of the comparison areas is again compared with each of the templates to acquire the mismatch rate to each template while shifting the comparison area one dot at a time along the x-axis until the right side of the last comparison area coincides with the line 87. This process repeats until all comparison areas in the matching area have been compared with the templates and the mismatch rate acquired for each comparison area and each template.

In the extracted image 70 used in this example comparison area 84 is the comparison area with the lowest mismatch rate in the second matching area, the position of this comparison area 84 is thus the position of the second recognized character and the recognized character is the number "1."

Whether character recognition succeeded within a specified distance is then determined in step S26. If the character string is a series of consecutive characters, this specified distance is defined as the distance along the y-axis at which the next character should be recognized after recognizing one character. If character recognition succeeds within this specified distance step S26 returns yes), the next matching area is set to the predicted range (step S27). In the extracted image 70 shown in FIG. 9 the number "1" is recognized in the character position of comparison area 84 in the second matching area as described above. The matching area of the extracted image 70 to which the recognition process is applied for a third time is therefore the matching area in the predicted range determined by the same method used to determine the second matching area.

If character recognition did not succeed in the specified distance (step S26 returns no), the next matching area is set to the full width of the extracted image 70 in step S28.

For example, if the number "0" shown in FIG. 9 is recognized in the fourth matching area while processing extracted image 70, the matching area of the fifth recognition process run on the extracted image 70 is matching area 92, which is a predicted range determined in the same way as the second matching area. However, because there are no magnetic ink characters in this matching area 92, white space continues. The x-axis width of the matching area is therefore set to the full x-axis width of the extracted image 70 from line 91 at the end of the area of continuous white space wherein no character is recognized within a specified distance. The specified distance is set, for example, to the width of two characters, that is, 40 dots. Line 91 in the extracted image 70 is thus 40 dots from the position where the number "0" was recognized, that is, from the recognized character position of number "0."

Operation when a noise character is recognized by mistake is described next.

In this example, the recognition process is run on the matching area covering the full x-axis width of the extracted image 70 from line 91, determines that a part of the signature image 72 in comparison area 93 matches one of the templates, and thus mistakenly recognizes part of the signature image 72 as a valid character. Step S26 thus returns yes, the next comparison area 94 is a predicted range determined in the same way as the foregoing second matching area, and the x-axis width of this comparison area 94 is the same as the x-axis width of the second matching area. However, this matching area 94 contains no magnetic ink characters and a blank space in which no character can be recognized continues.

As a result, step S26 returns no, and the x-axis width of the matching area is reset to the full x-axis width of the extracted image 70 from line 95, which is positioned where the blank space in which character recognition is not successful continues for a specified distance. By thus setting the width of the next matching area to the full x-axis width of the extracted image 70, a magnetic ink character is contained in the next matching area and a magnetic ink character can thus be recognized.

When a noise character is thus erroneously recognized, the matching area is reset in line with the mistakenly recognized noise character, and an area separated from the character string being read is thus subjected to the character recognition process. However, if blank (white) space containing no recognizable characters continues for a specified distance, the x-axis width of the matching area is reset to the full x-axis width of the extracted image 70, and the matching area can thus be realigned with the desired string of characters being read.

Whether the recognition process has been applied to the entire area is then determined in step S29 after either step S27 or step S28. Recognition processing of the extracted image 70 ends when processing the last matching area in the extracted image 70 ends. This last matching area is the range for which the bottom edge is coincident with the bottom edge of the extracted image 70.

If recognition processing has not ended (step S29 returns no), control loops back to step S25, the recognition process is applied to the matching area set in step S27 or step S28, and steps S26 to S29 repeat.

When the recognition process ends (step S29 returns yes), optical reading of the characters by the OCR apparatus ends.

This embodiment of the invention has the following effects.

(1) To allow for variation in the position of the MICR recording area 23 and the dimensions of the check 20, the size of the extracted image 70 is sufficiently larger than the MICR image 71 to ensure that it is contained within the extracted image 70, so that all characters in the magnetic ink character string can be read by applying the recognition process to the extracted image 70.

(2) The dimension along the x-axis of the first matching area to which the recognition process is applied in the extracted image 70 is the width of the extracted image 70. Recognition is therefore possible regardless of where the magnetic ink characters are located along the x-axis of the extracted image 70.

(3) If a character is recognized, the next matching area is set to a predicted range, which is a narrower width than that of the extracted image 70. The number of comparisons with the templates is thus reduced and less time is needed for the recognition process.

(4) The x-axis width of the predicted matching area is the x-axis width of the comparison area in which the character was recognized plus a correction margin on both sides to allow for variation in the x-axis position of adjacent characters.

(5) If a blank space containing no recognizable characters continues for a specified distance, the x-axis width of the matching area returns to the full x-axis width of the extracted image 70. Even if a noise character, which is any character outside of the desired character string being read, is mistakenly recognized, the likelihood of a series of noise characters being mistakenly consecutively read is very low. Therefore, if a blank area containing no valid characters continues for a specified distance, the x-axis width of the matching area is reset to the full x-axis width of the extracted image 70. The probability that the characters in the desired character string can be correctly recognized is thus improved even if a noise character is mistakenly recognized at a position separated from the desired character string. In other words, the shift in the x-axis position of the area being read resulting from a noise character being mistakenly recognized can be corrected.

While the invention has been described and illustrated in the context of the foregoing embodiments, the invention is not limited to these embodiments. Rather, many variations, which will be apparent to those skilled in the art in light of the foregoing, are possible. Such variations are intended as part of the invention to the extent they fall within the spirit and scope of the accompanying claims. Some examples of such variations are described below.

Variation 1: The range along the x-axis used as the predicted dimension of the next matching area is the x-axis width of the comparison area in which a character was recognized plus a correction margin of a specified number, e.g., 5, of dots on both sides. More particularly, the correction margin is desirably set with consideration for variation in the x-axis position of adjacent characters so that the next character recognized will be within the matching area.

Variation 2: If the blank space in which character recognition is not possible continues for a specified distance, e.g., 40 dots, from the character position of the previously recognized character, the x-axis width of the matching area is reset to the full x-axis width of the extracted image 70. More particularly, the specified distance is preferably set based on the size of the characters being read so that the matching area extends across the full width of the extracted image 70 when blank space in which character recognition is not possible continues for a distance enabling the blank space to be accurately detected.

Variation 3: If the blank space in which character recognition is not possible continues beyond a specified distance from the character position of the previously recognized character, the x-axis width of the matching area is reset to the full x-axis width of the extracted image 70 for the next recognition process. Instead of applying the recognition process to the next matching area at a different y-axis position in this situation, the matching area can be reset to start from the beginning of the blank area in which characters cannot be recognized and continue across the full x-axis width of the extracted image 70 so that the area in which character recognition failed is also processed again. By thus applying the recognition process to the area adjacent to the detected noise character when a noise character is mistakenly recognized, magnetic ink characters near the same y-axis position as the area adjacent to the noise character can be prevented from being dropped from the matching area and thus not recognized.

Variation 4: The printing mechanism in the foregoing embodiment is a dot impact print head that transfers ink from an ink ribbon to the check 20. An inkjet head or other type of print head could alternatively be used.

Variation 5: The reading process ends after the reading results are stored in the foregoing embodiment, but the reading result could instead be verified.

Variation 6: The reading process ends after the reading results are stored in the foregoing embodiment, but the reading result could instead be presented on a display unit.

Variation 7: When reading is not possible the foregoing embodiment presents a reading failure error on the display unit 7 of the host apparatus 6, but the error could also be presented on the display unit of the hybrid processing apparatus.

Variation 8: CPU 60 runs a software program to achieve the functions of the foregoing embodiment, but if these functions can be achieved by means of discrete electronic circuits without using such an operating device, the electronic circuits can be used instead.

Variation 9: The recognition process runs in the foregoing embodiment using a hybrid processing apparatus 10 composed of a magnetic reading mechanism 45, printing mechanism 46, and optical reading mechanism 47, and the CPU 60 of a separate host apparatus 6. The recognition process does not, however, require using the CPU of a separate host. More particularly, the CPU 41 of the hybrid processing apparatus 10 or other control unit 40 could run the recognition process. Furthermore, the host apparatus 6 could be a host dedicated to the MICR apparatus, a POS terminal, or other host.

Other aspects of the present invention that will be understood from the foregoing description of preferred embodiments and variations thereof are described below.

(1) In a character reading method having a step in which the matching area determination unit sets the matching area to which the OCR processing unit applies the next recognition process, the matching area determination unit sets the width of the matching area to which the OCR processing unit applies the next recognition process to the width of the template plus a specific correction margin when the template is in the position of the recognized character. This width of the matching area is the width in the direction perpendicular to the character string being read, and the width of the template is the width of the template in the direction perpendicular to the base line of the character string.

(2) In a program for causing a computer to execute a process having a step wherein the matching area determination unit of the computer sets the matching area to which the OCR processing unit of the computer applies the next recognition process based on the position of a recognized character, the matching area determination unit of the computer sets the width of the matching area to which the OCR processing unit of the computer applies the next recognition process to the width of the template plus a specific correction margin when the template is in the position of the recognized character. This width of the matching area is the width in the direction perpendicular to the character string being read, and the width of the template is the width of the template in the direction perpendicular to the base line of the character string.

(3) An optical reading apparatus wherein the starting point of the recognition process in the processing range in the direction aligned with the base line of the character string is a position offset to the recognized character position side from the boundary on the next character position side of the recognized character position. The distance of this offset is a correction margin determined with consideration for the white space contained in the templates.

The recognition process thus starts from a position adjusted on the recognized character position side to allow for the white space contained in the templates. Because the area of one character includes both the character and white space, the white space in adjacent characters may overlap even if the characters do not overlap. Starting the recognition process from a corrected position on the recognized character position side can thus prevent the overlapping portion from being excluded from the recognition target. The character portion of the recognized character position is also excluded from the next recognition target, and unnecessarily applying the recognition process a second time to already recognized characters can thus be prevented.

The invention is intended to include other variations, modifications or changes to the extent they fall within the spirit and scope of the appended claims.

What is claimed is:

1. An apparatus for optically reading a string of characters contained in a scanned image, comprising:
    an optical recognition unit configured to (i) extract a recognition image containing the string of characters and a neighboring image area from the scanned image, the recognition image containing a plurality of matching areas, and (ii) apply a recognition process to the recognition image by comparing each matching area with templates; and
    a matching area determination unit configured to determine and set a size of each of a second and subsequent matching areas to which the optical character recognition unit applies the recognition process based on a position at which a character in the string of characters in an immediately previous matching area was recognized;
    wherein, if a noise character is erroneously recognized and no character is recognized within a specific distance from the noise character, a next matching area is reset.

2. The apparatus as described in claim 1, wherein the matching area determination unit sets a width of each of the second and subsequent matching areas to a width that is less than a width of the recognition image when the character in the immediately previous matching area was recognized, the widths being substantially perpendicular to a reading direction of the string of characters.

3. The apparatus as described in claim 2, wherein, when the optical character recognition unit cannot recognize a character within a specified distance from the beginning of a particular matching area, the matching area determination unit resets the width of that matching area to the width of the recognition image at the specified distance.

4. The apparatus as described in claim 1, wherein the optical reading apparatus is disposed in a character reading system comprising a hybrid processing apparatus and host apparatus, the optical character recognition unit and matching area determination unit being disposed in the host apparatus.

5. A magnetic ink character reading apparatus comprising an optical reading apparatus as described in claim 1, the magnetic ink character reading apparatus further comprising:
    a hybrid processing apparatus comprising a magnetic reading unit configured to magnetically acquire magnetic data from the string of characters, which are magnetic characters; and
    a host apparatus comprising a magnetic recognition processing unit for recognizing the magnetic data, wherein the optical character recognition unit and the matching area determination unit are also disposed in the host apparatus.

6. The magnetic ink character reading apparatus as described in claim 5, wherein the hybrid processing apparatus comprises a printing unit configured to print based on data sent from the host apparatus.

7. A POS terminal apparatus comprising a magnetic ink character reading apparatus as described in claim 5.

8. A character reading method comprising the steps of:
    using a processor and memory for
    acquiring a scanned image containing a string of characters;
    extracting a recognition image containing the string of characters and a neighboring image area from the scanned image, the recognition image containing a plurality of matching areas;
    applying a recognition process to the recognition image by comparing each matching area with templates; and
    determining and setting a size of each of a second and subsequent matching areas to which the recognition process is applied based on a position at which a character in the string of characters in an immediately previous matching area was recognized;
    wherein, if a noise character is erroneously recognized and no character is recognized within a specific distance from the noise character, a next matching area is reset.

9. A character reading method as described in claim 8, wherein, in the determining step, a width of each of the second and subsequent matching areas is set to a width that is less than a width of the recognition image when the character in the immediately previous matching area was recognized, the widths being substantially perpendicular to a reading direction of the string of characters.

10. A character reading method as described in claim 9, wherein, when, in the applying step, a character is not recognized within a specified distance from the beginning of a particular matching area, the matching area resets the width of that matching area to the width of the recognition image at that specified distance.

11. A computer-readable medium containing a program of instructions adapted to cause, when executed, a computer to perform the operations of:
    acquiring a scanned image containing a string of characters;
    extracting a recognition image containing the string of characters and a neighboring image area from the scanned image, the recognition image containing a plurality of matching areas;
    applying a recognition process to the recognition image by comparing each matching area with templates; and determining and setting a size of each of a second and subsequent matching areas to which the recognition process is applied based on a position at which a character in the string of characters in an immediately previous matching area was recognized;

wherein, if a noise character is erroneously recognized and no character is recognized within a specific distance from the noise character, a next matching area is reset.

* * * * *